United States Patent [19]
Steinbrecher

[11] Patent Number: 6,151,194
[45] Date of Patent: Nov. 21, 2000

[54] THIN FILM INDUCTIVE TRANSDUCER WITH ALUMINA GAP POSITIONED OVER COILS

[75] Inventor: Steven L. Steinbrecher, Longmont, Colo.

[73] Assignee: Storage Technology Corporation, Louisville, Colo.

[21] Appl. No.: 09/262,190

[22] Filed: Mar. 4, 1999

[51] Int. Cl.[7] .................................................. G11B 5/31
[52] U.S. Cl. .......................................... 360/126; 360/119
[58] Field of Search ................................. 360/126, 119, 360/120

[56] References Cited

U.S. PATENT DOCUMENTS

| | | | |
|---|---|---|---|
| 3,700,827 | 10/1972 | Nagao | 360/119 |
| 4,016,601 | 4/1977 | Lazzari | 360/122 |
| 4,190,872 | 2/1980 | Jones, Jr. et al. | 360/125 |
| 5,198,949 | 3/1993 | Narisawa et al. | 360/126 |
| 5,224,002 | 6/1993 | Nakashima et al. | 360/126 |
| 5,241,440 | 8/1993 | Ashida et al. | 360/126 |
| 5,590,008 | 12/1996 | Tanabe et al. | 360/126 |
| 5,784,772 | 7/1998 | Ewasko et al. | 29/603.15 |
| 5,811,018 | 9/1998 | Ewasko et al. | 216/22 |
| 5,855,056 | 1/1999 | Cates | 29/603.14 |
| 6,034,848 | 3/2000 | Garfunkel et al. | 360/126 |

*Primary Examiner*—Brian E. Miller
*Attorney, Agent, or Firm*—Brooks & Kushman P.C.

[57] ABSTRACT

A thin film inductive transducer is described for recording magnetic transitions on a track of a moving magnetic recording medium. The transducer includes a first layer of a magnetic material deposited on a substrate in two stages to provide a deposit of reduced thickness in a pole tip region adjacent one end of what will become a yoke structure. An insulating material is deposited on the first layer. A conductor coil having generally helical turns is deposited on the insulating layer. A non-magnetic material is deposited on the conductor coil. An insulating material is deposited over the non-magnetic material. A second layer of magnetic material is deposited over the last mentioned insulating material and cooperates with the first layer to form the yoke structure in which the layers straddle and are insulated from the coil. The first and second layers are separated at the pole tip region by the non-magnetic material to form a magnetic gap. Preferably, the non-magnetic material is aluminum oxide.

4 Claims, 1 Drawing Sheet

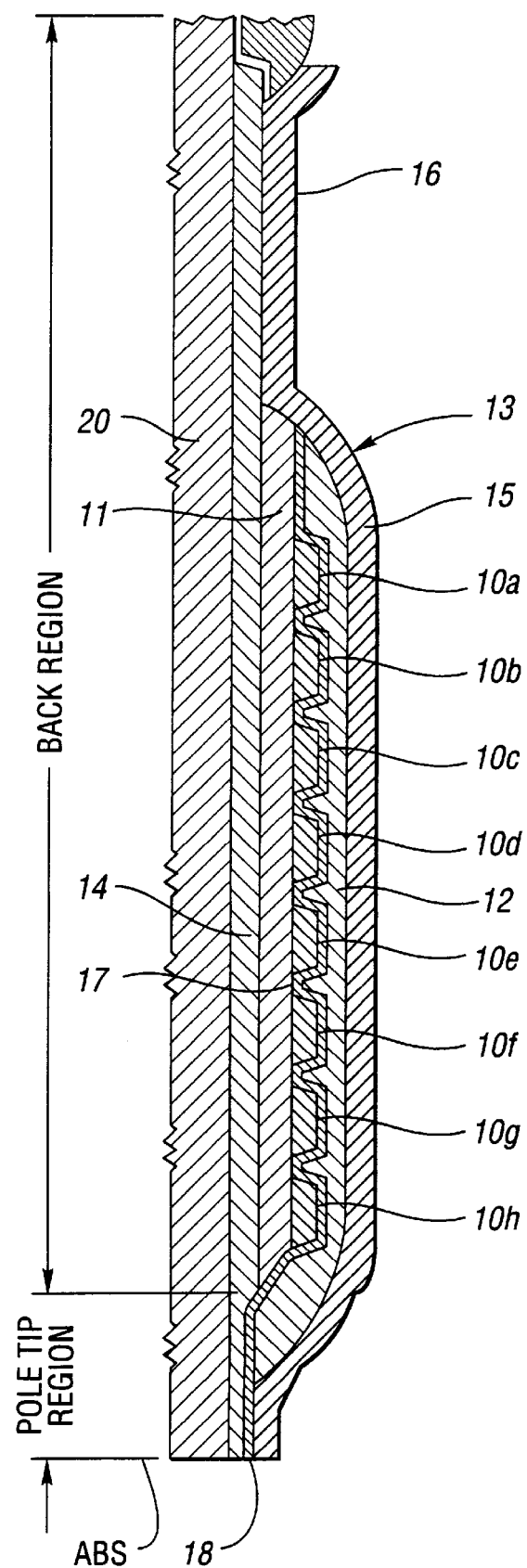

THIN FILM INDUCTIVE TRANSDUCER WITH ALUMINA GAP POSITIONED OVER COILS

TECHNICAL FIELD

The present invention relates to a thin film inductive transducer in which a non-magnetic material layer, such as aluminum oxide, is deposited directly on top of the conductor coil to improve adhesion, protect the coil and protect the lap straps.

BACKGROUND ART

Various configurations have been utilized to enhance efficiency of thin film inductive transducers used for recording magnetic transitions on a moving magnetic recording medium.

U.S. Pat. No. 3,700,827 discloses a thin film magnetic head with a yoke structure that narrows from a back region to a pole tip region. A separate magnetic core interconnects the yoke pieces at the back region. A wire coil encircles the magnetic core for activating the pole pieces during recording and transmitting electrical pulses activated in the coil during reading of magnetic transitions from a magnetic recording medium.

U.S. Pat. No. 4,016,601 discloses an integrated magnetic head assembly wherein the pole pieces have a reduced width in the pole tip region and a flat conductor winding coil has a branch inserted between the pole piece layers. The reduction in width in the pole tip region is achieved by etch removal of concave portions of the substrate and pole pieces, such that the distance between the end of the pole tip and the wide portion of the yoke structure is greater than the thickness of one of the magnetic layers plus the magnetic gap.

U.S. Pat. No. 4,190,872 provides a pole tip region of preselected constant relatively narrow width comprising two thin magnetic layers that extend in a direction normal to the magnetic medium. The effects of spurious signals from adjacent tracks on the medium are minimized by having the pole tip region extend a distance at least 5/D, where D is the recording density. The cross-sectional area of the yoke structure in the back region is progressively increased in width rearward of the pole tip region.

In U.S. Pat. No. 4,190,872, the non-magnetic layer separating the first and second layers of magnetic materials is deposited directly on the first layer of magnetic material. It has also been proposed to deposit the non-magnetic layer between the second insulating material and the second layer of magnetic material. However, these techniques have been plagued by poor adhesion of the non-magnetic material and chemical attack of the coils and lap straps.

DISCLOSURE OF INVENTION

The present invention overcomes the above-referenced short comings of prior art thin film inductive transducers by positioning the non-magnetic material layer directly on top of the conductor coil, thereby improving adhesion, and protecting the coil and lap straps from chemical attack in processing.

More specifically, the present invention provides a thin film inductive transducer for recording magnetic transitions on a track of a moving magnetic recording medium. The transducer includes a first layer of a magnetic material deposited on a substrate in two stages to form the magnetic pole adjacent one end of what will become a yoke structure. An insulating material is deposited on the first layer. A conductor coil having generally helical turns is deposited on the insulating layer. A non-magnetic material is deposited on the conductor coil. An insulating material is deposited over the non-magnetic material. A second layer of magnetic material is deposited over the last mentioned insulating material and cooperates with the first layer to form the yoke structure in which the layers straddle and are insulated from the coil. The first and second layers are separated at the pole tip region by the non-magnetic material to form a magnetic gap.

The present invention also provides a method of manufacturing a thin film inductive transducer as described above in which the non-magnetic material is deposited directly on the conductor coil to improve adhesion and protect the coil and lap straps from chemical attack. This process also reduces inconsistent coil resistance problems by eliminating copper oxidation and eliminates undesirable notching of the top pole.

Accordingly, an object of the invention is to provide an improved thin film inductive transducer in which adhesion of the non-magnetic material is improved, and the conductor coil and lap straps are protected by chemical attack in processing.

The above object and other objects, features and advantages of the present invention are readily apparent from the following detailed description of the best mode for carrying out the invention when taken in connection with the accompanying drawing.

BRIEF DESCRIPTION OF DRAWING

The FIGURE shows a sectional view of a thin film inductive transducer embodying the invention.

BEST MODE FOR CARRYING OUT THE INVENTION

Supporting disclosure and background information relevant to the present invention may be found in U.S. Pat. Nos. 4,190,872; 5,784,772; 5,811,018; and 5,855,056, each of which are hereby incorporated by reference in their entirety.

As illustrated in the FIGURE, the thin film transducer embodying the invention comprises a flat conductor coil 10 having a plurality of turns 10a–h plated in an elliptical pattern between an insulating material 11 and a non-magnetic material 17, such as aluminum oxide.

A yoke structure 13 consists of a pole tip region and a back region, as identified in the FIGURE, and comprises two layers 14,15 of a magnetic material, such as Permalloy. These layers 14,15 are positioned against insulating layers 11,12, respectively, except at a back gap 16 in the back region where they make physical contact, and at the pole tip region where they are spaced by the thin layer 17 of non-magnetic material to form a transducing gap 18. The end of transducing gap 18 coincides with an air bearing surface (ABS) formed on a non-magnetic ceramic slider 20 on which the above-described layers are deposited. Transducer gap 18 interacts in air bearing relation with a magnetic recording medium (not shown), such as a rotatable magnetic disk, when the latter rotates and flies closely adjacent the air bearing surface.

In accordance with the invention, the yoke structure 13 is fabricated in the following manner. A first layer of magnetic material 14 is deposited on the slider 20 in two stages, using appropriate masks, to form the magnetic pole. The insulating material 11 is then deposited on the first layer 14, except at the transducer gap 18. Elliptically spiraling turns 10*a–h* of a continuous flat conductor coil 10 are plated on the insulating layer 11. At this stage, the non-magnetic aluminum oxide layer 17 is deposited over the conductor coil 10*a–h*. The non-magnetic material 17 extends into the pole tip region to form the transducer gap 18 between the first and second layers 14,15 of magnetic material. Insulating material 12 is then deposited over the non-magnetic material 17. The magnetic layer 15 is then deposited over the insulating material 12, except at the back gap 16 where it makes physical contact with the magnetic layer 14. The magnetic layer 15 is preferably deposited in two stages, using appropriate masks, so that its thickness in the back region is greater than that in the pole tip region.

The primary feature of the invention is that the non-magnetic material 17 is deposited directly over the coil 10*a–h*. This seals the coil 10*a–h* and lap straps (not shown—used to guide mechanical lapping of the pole tip) from oxidation and chemical attack. Also, in this configuration, the non-magnetic gap material 17 forms a substantially continuous plane in the pole tip region which overcomes the delamination affects caused by large topography step coverage, and is perhaps easier to manufacture as well. It may also reduce top pole notching, which is currently a significant wafer yield issue.

This invention has resulted in significant yield increases for manufacturing.

While the best mode for carrying out the invention has been described in detail, those familiar with the art to which this invention relates will recognize various alternative designs and embodiments for practicing the invention within the scope of the appended claims.

What is claimed is:

1. A thin film inductive transducer for recording magnetic transitions on a track of a moving magnetic recording medium, said transducer comprising:
    a first layer of a magnetic material deposited on a substrate in two stages to provide a deposit of reduced thickness in a pole tip region adjacent one end of what will become a yoke structure;
    an insulating material deposited on said first layer of magnetic material;
    a conductor coil having generally helical turns, respective portions of which are deposited on said insulating material;
    a non-magnetic material deposited on said conductor coil;
    an insulating material deposited over the non-magnetic material;
    a second layer of magnetic material deposited over the last-mentioned insulating material and cooperating with said first layer of magnetic material to form the yoke structure in which said first and second layers straddle and are insulated from said coils;
    said first and second layers being separated at the pole tip region by said non-magnetic material to form a magnetic gap.

2. The transducer of claim 1, wherein said non-magnetic material comprises aluminum oxide.

3. A method of manufacturing a thin film inductive transducer for recording magnetic transitions on a track of a moving magnetic recording medium, the method comprising:
    depositing a first layer of a magnetic material on a substrate;
    depositing an insulating material on said first layer of magnetic material;
    depositing a conductor coil on the insulating material;
    depositing a non-magnetic material over the conductor coil;
    depositing an insulating material over the non-magnetic material;
    depositing a second layer of magnetic material over the last mentioned insulating material in a manner to cooperate with said first layer of magnetic material to form a yoke structure in which said first and second layers straddle and are insulated from said coil, and form a pole tip region adjacent one end thereof, such that said first and second layers are separated at the pole tip region by a non-magnetic material to form a magnetic gap.

4. The method of claim 3 wherein said step of depositing a non-magnetic material comprises depositing aluminum oxide.

* * * * *